United States Patent

[11] 3,554,359

[72] Inventor Ernest J. Sarring
Fort Thomas, Ky.
[21] Appl. No. 871,001
[22] Filed July 8, 1969
Division of Ser. No. 700,414, June 25, 1966, Patent No. 3,494,455.
[45] Patented Jan. 12, 1971
[73] Assignee Crawley Machinery Co.
Newport, Ky.
a corporation of Ohio

[54] BOOK-TRANSFERRING APPARATUS
1 Claim, 26 Drawing Figs.
[52] U.S. Cl. .................................................. 198/103
[51] Int. Cl. ..................................................... B65g 37/00
[50] Field of Search ......................................... 198/103, 124

[56] References Cited
UNITED STATES PATENTS
1,892,670  1/1933  Jaeger ........................ 198/103

Primary Examiner—Evon C. Blunk
Assistant Examiner—Alfred N. Goodman
Attorney—Wood, Herron and Evans ABSTRACT: Apparatus for transferring books from a first upper station, to which books are sequentially conveyed horizontally with their backbones leading, alternatively to second and third lower stations at each of which the books are deposited at fixed positions in a vertical disposition with their backbones lowermost, and thereafter advancing the books horizontally from their fixed positions to selectively variable delivery positions.

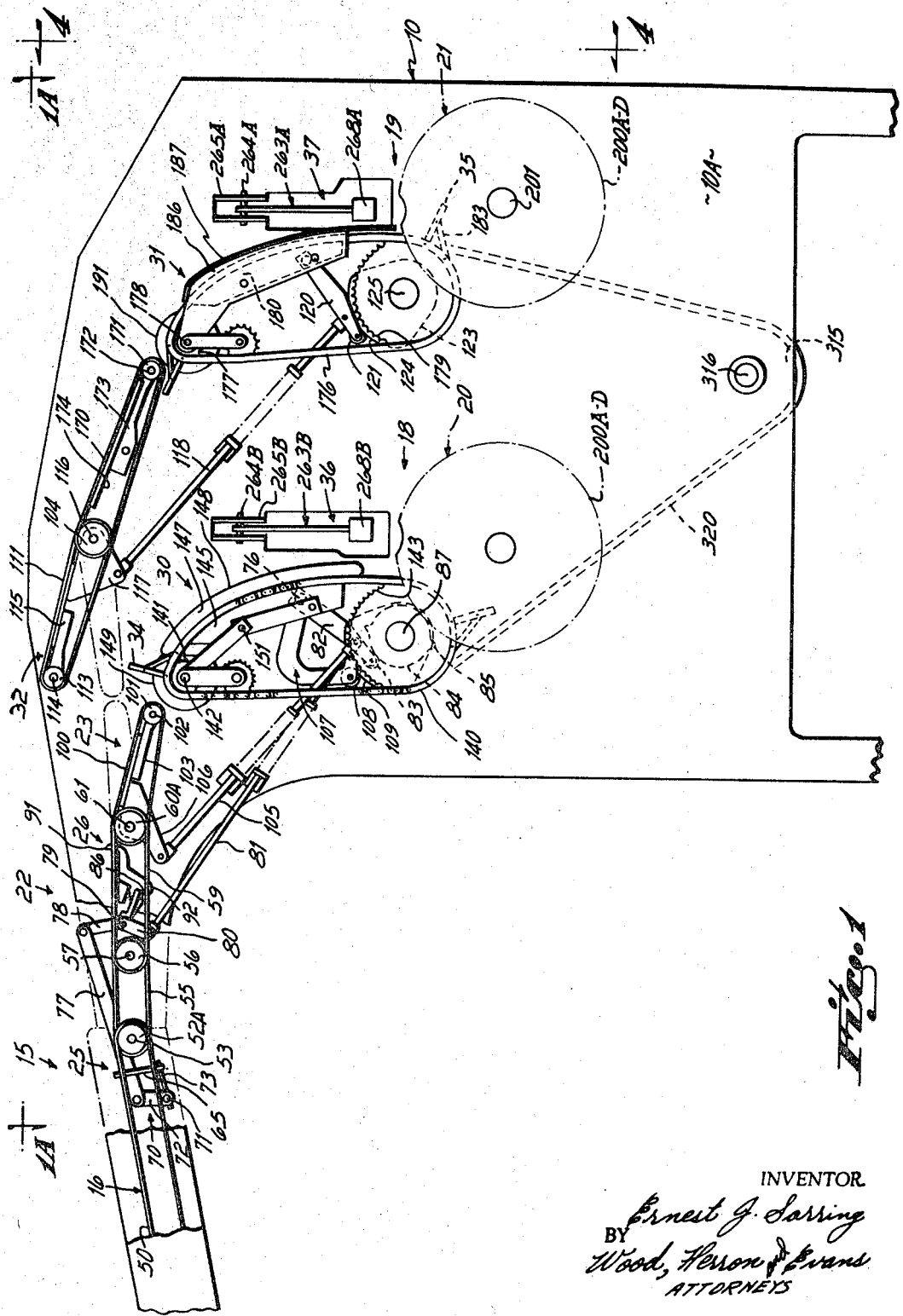

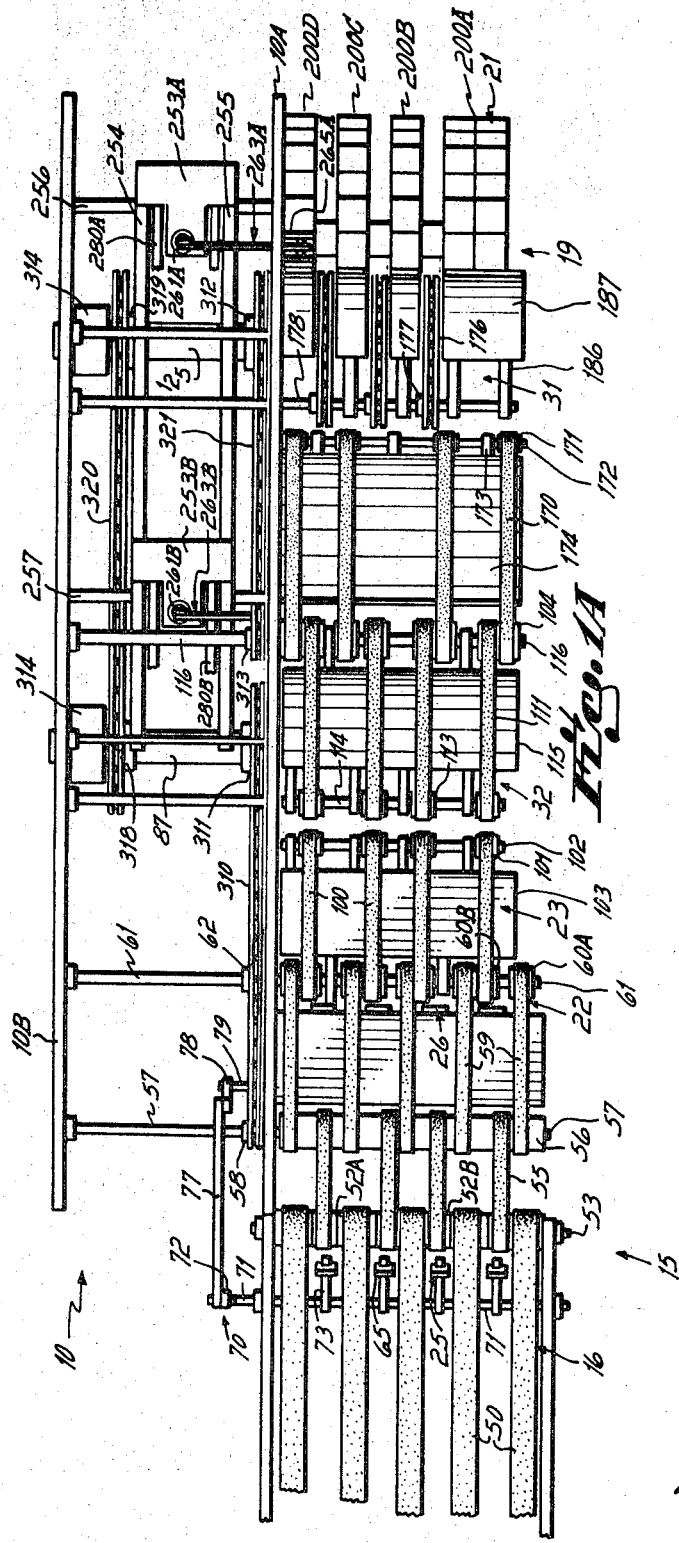

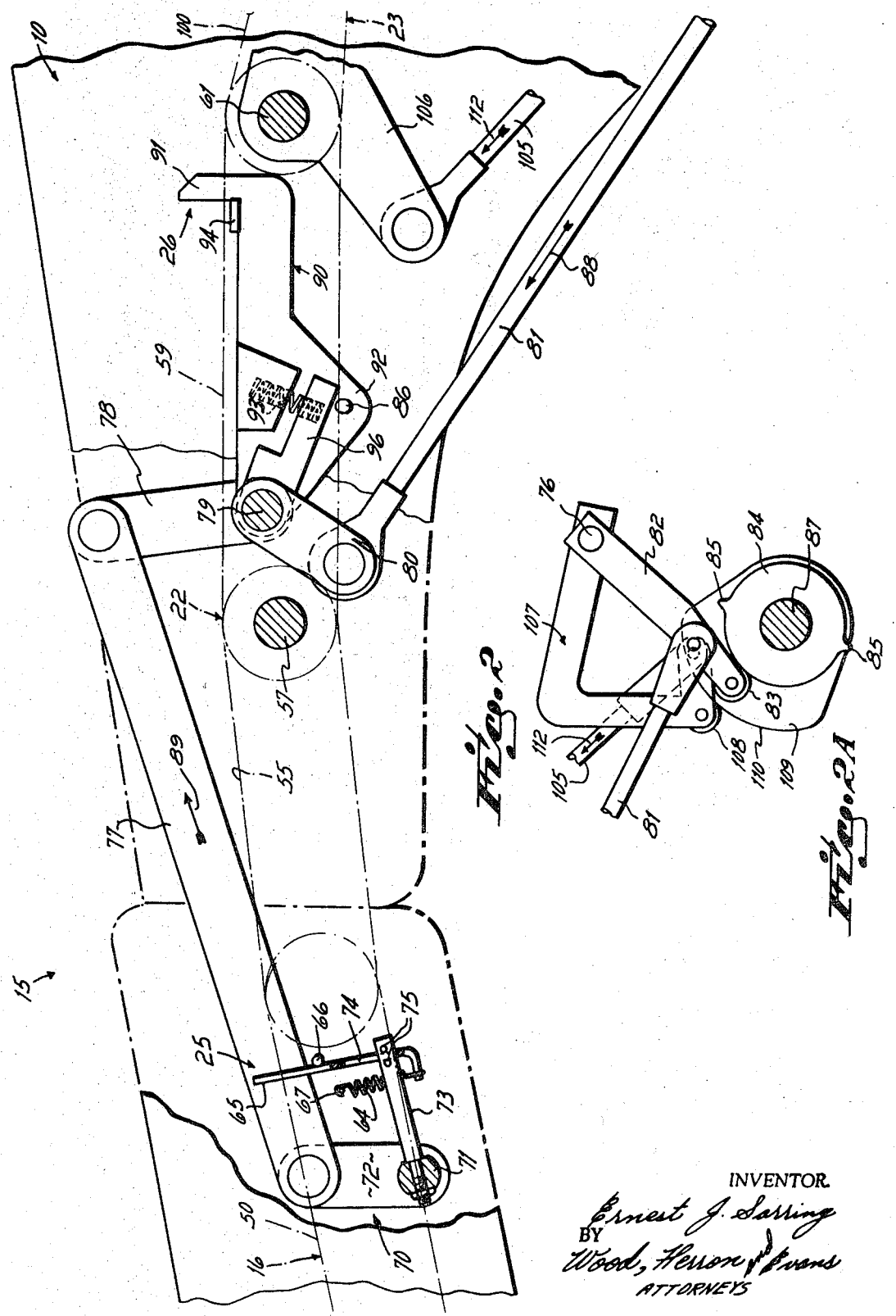

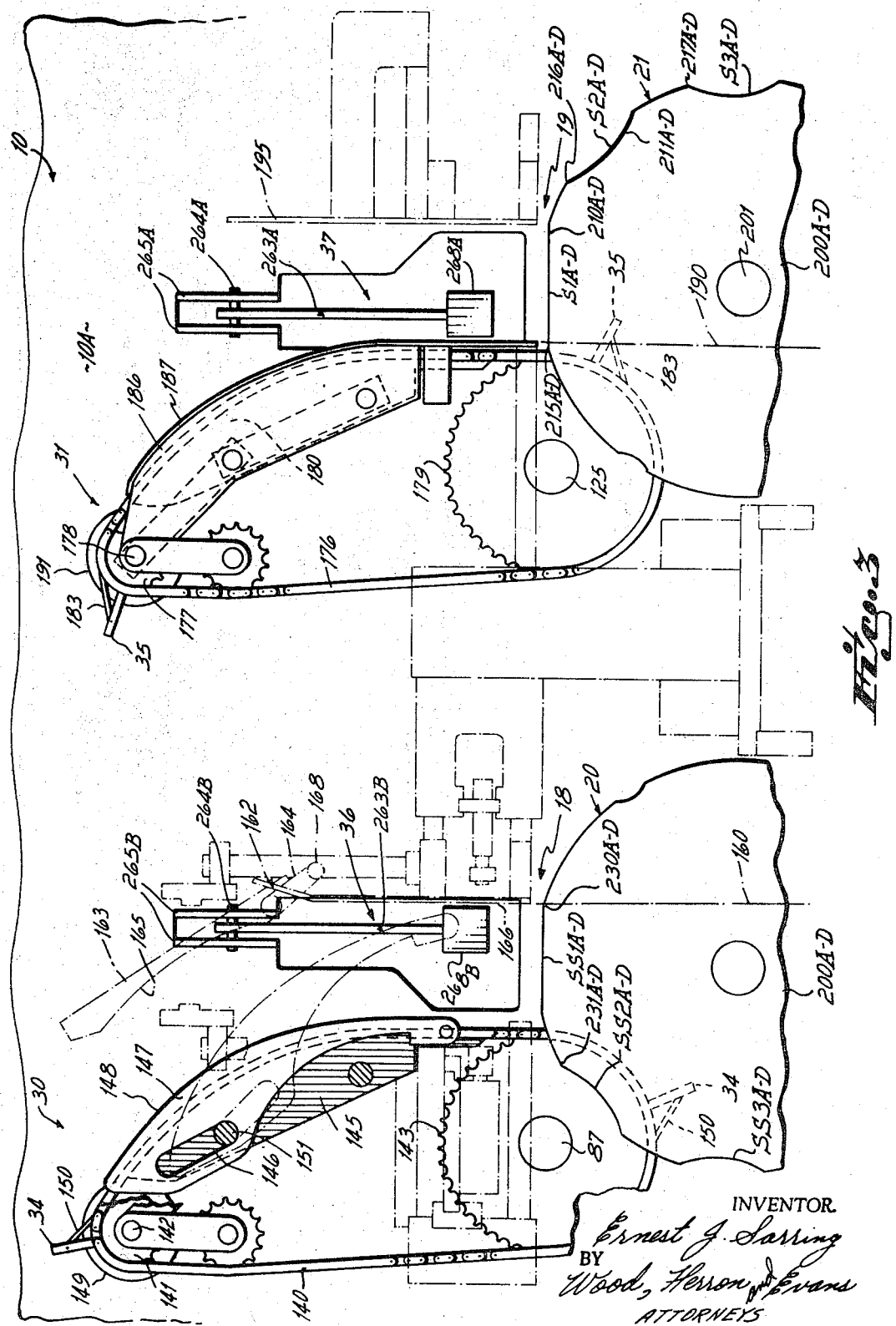

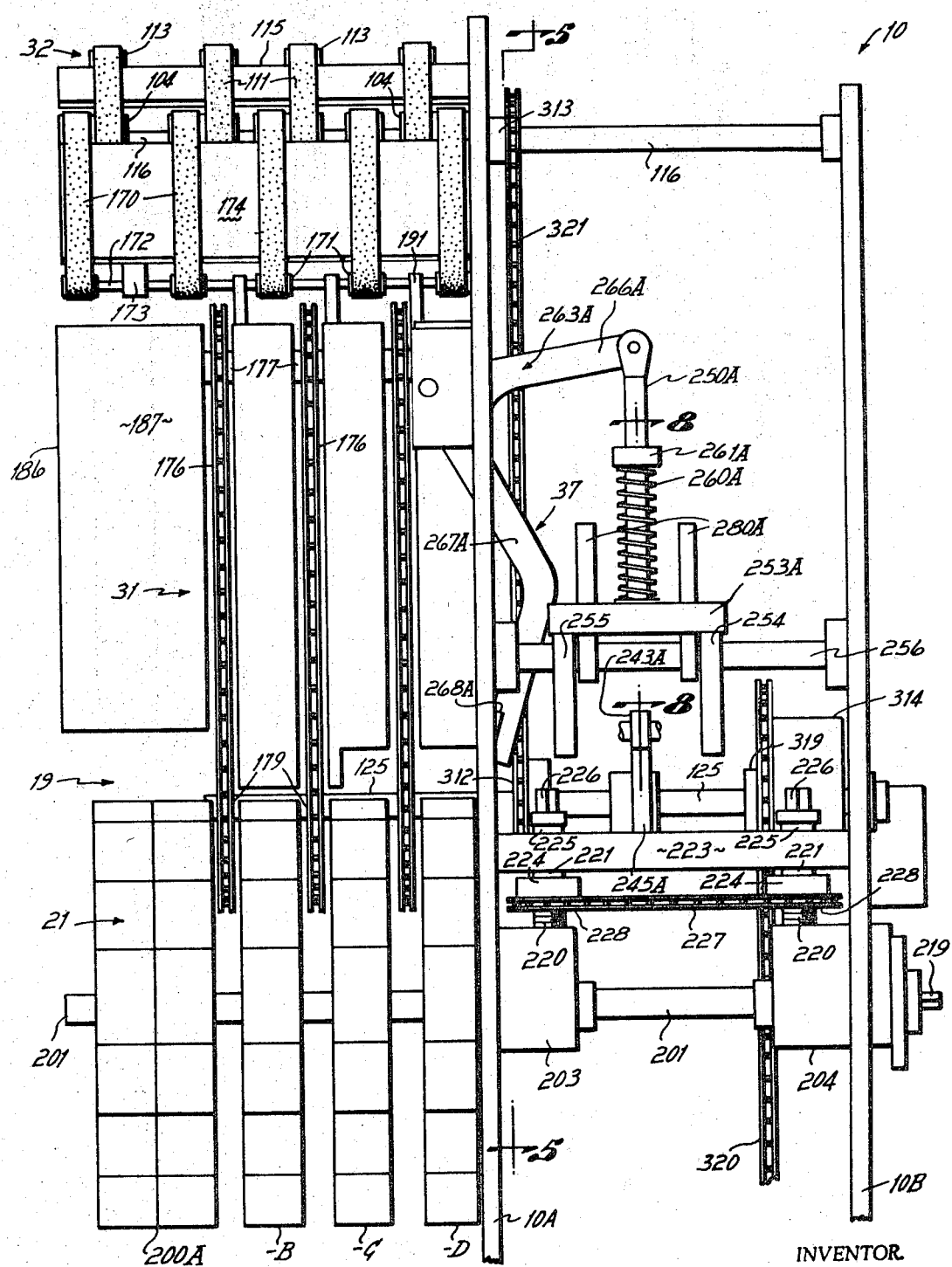

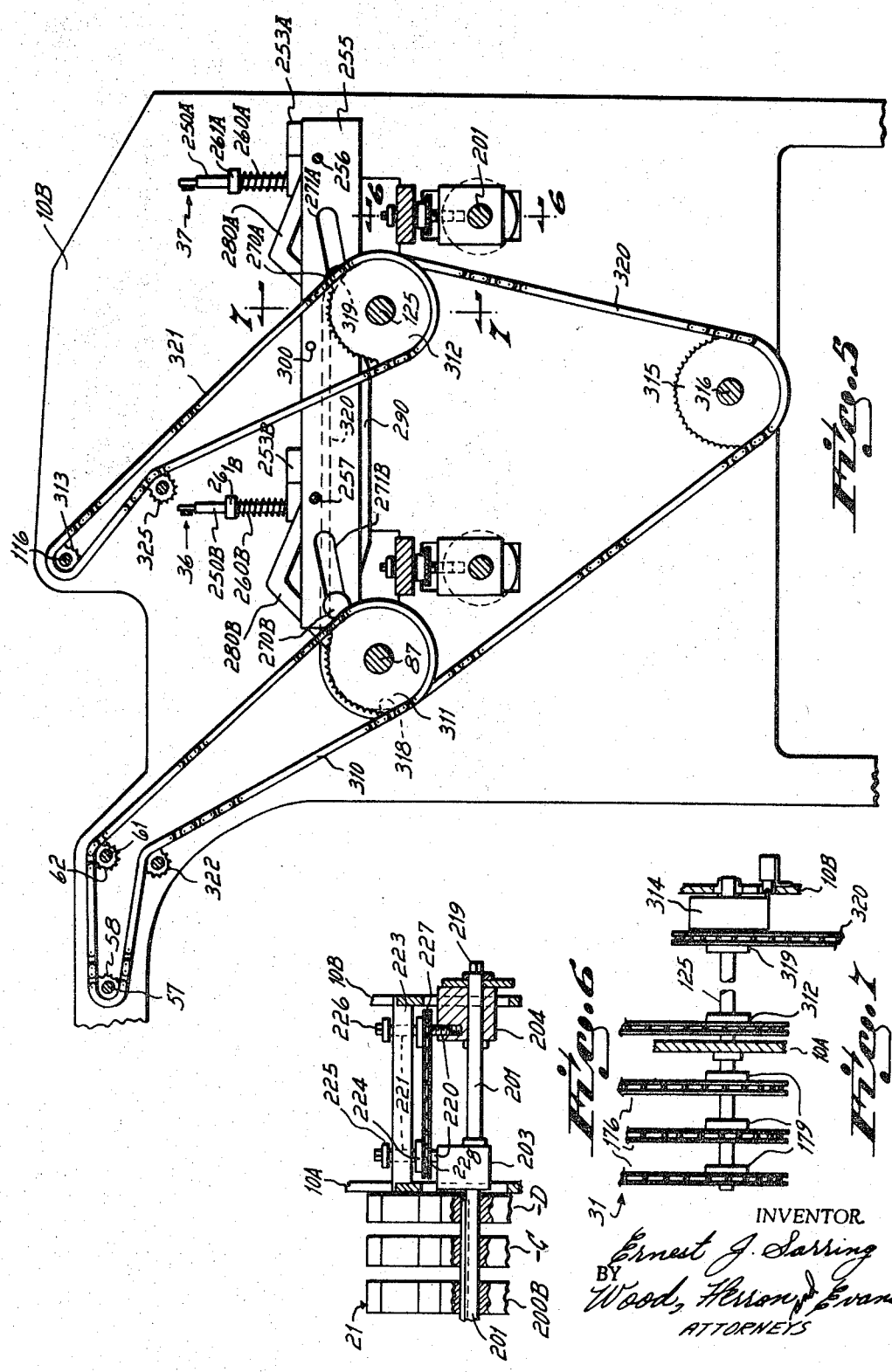

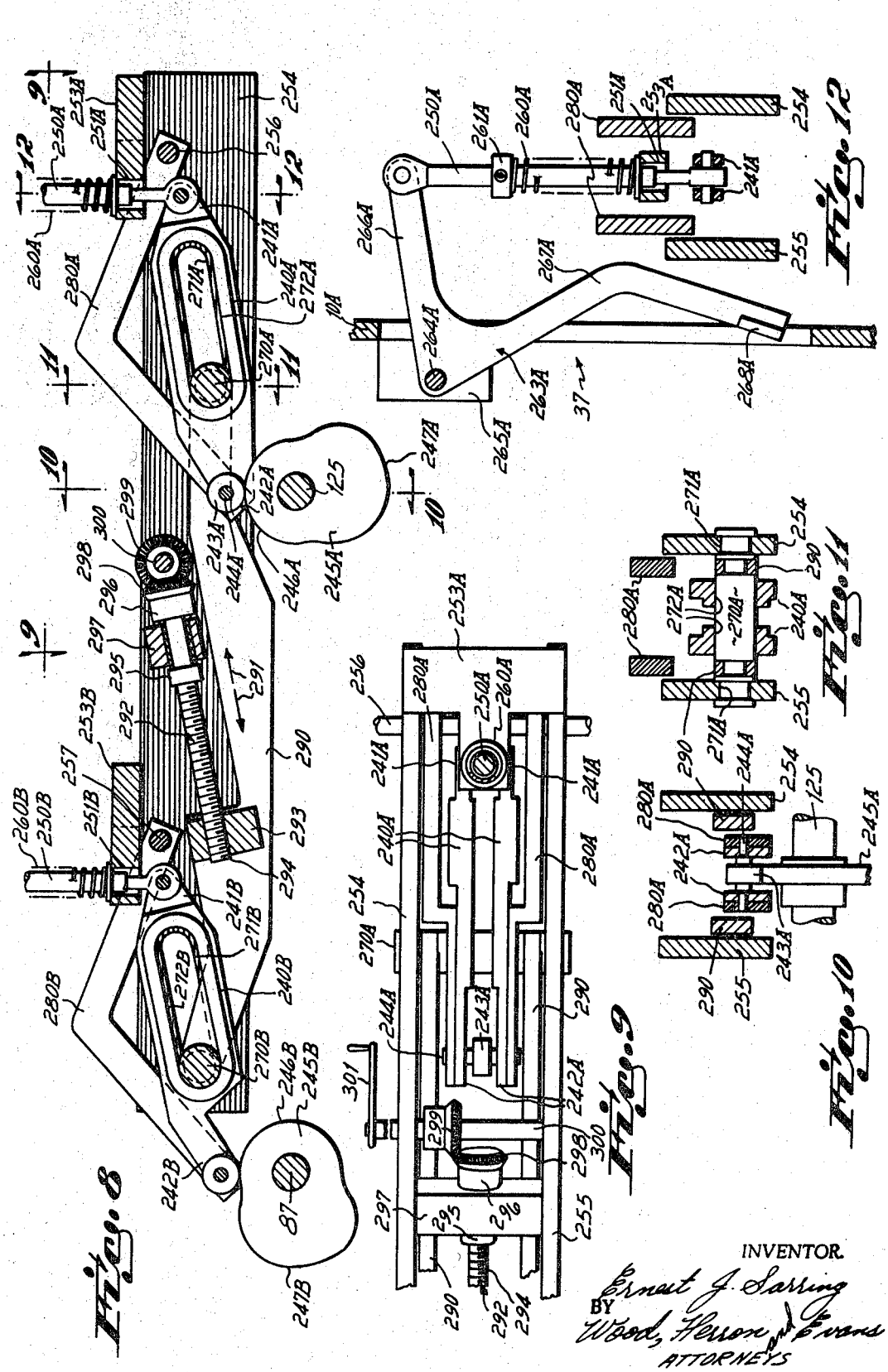

INVENTOR.
Ernest J. Sarring
BY
Wood, Herron & Evans
ATTORNEYS

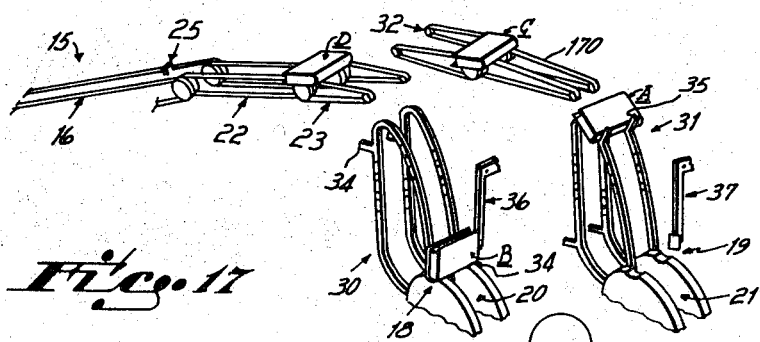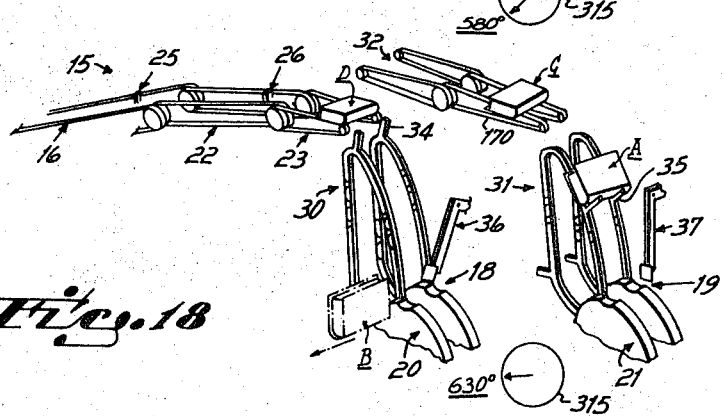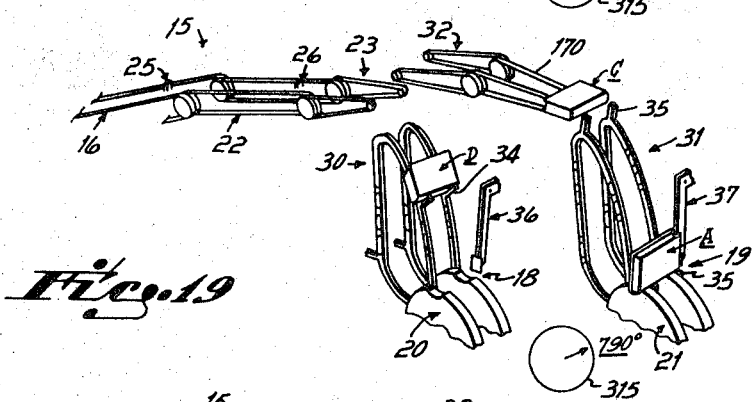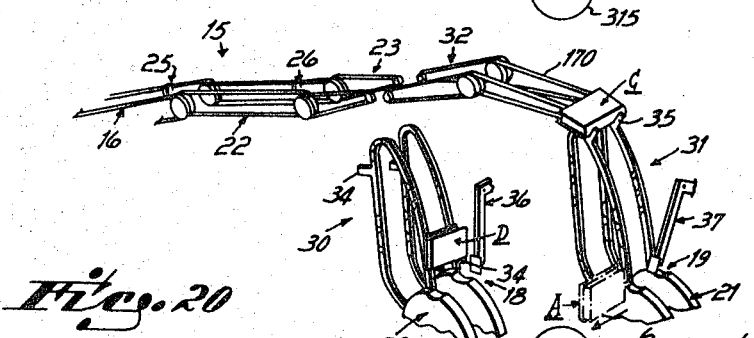

INVENTOR.
Ernest J. Sarring
BY
Wood, Herron & Evans
ATTORNEYS

BOOK-TRANSFERRING APPARATUS

This application is a division of parent Pat. application Ser. No. 700,414, filed Jan. 25, 1968, now U.S. Pat. No. 3,494,455, issued Feb. 10, 1970.

This invention relates to apparatus for transporting books, and more particularly to apparatus for transporting books between individual processing stations of an automated multistation bookbinding assembly line.

In a typical bookbinding assembly line a book undergoes a number of sequential operations or steps before fully assembled and ready for packaging and shipment. For example, the signatures comprising the book, each of which may include from two to 64 pages, are gathered together and aligned. Once gathered and aligned, the signatures are then sewn, stitched or otherwise fastened along a common edge known as the backbone edge. Glue is thereafter applied to the end sheets and the glued assembly inserted into a case which forms the cover thereof. This gluing and insertion is known as the "casing-in" step. When the signatures with their freshly glued end sheets have been inserted into a case, the assembly is generally subjected to a further processing step, namely, the "building-in" step, wherein pressure is applied to the boards of the case for the purpose of bringing the end sheets and case into intimate contact and thereby enhancing adhesion.

In addition to signature gathering and fastening, casing-in, and building-in, other steps may be included in the bookbinding operation depending on the type and the quality of book desired. For example, in high quality books where it is essential to squarely position the signatures within the case, it is not uncommon to introduce a "squaring" step intermediate casing-in and building-in operations. During the squaring step, the signatures are further inserted into the case, and any antiparallelism or skew between the case and signatures eliminated.

As those skilled in the art will appreciate the various steps necessary to complete a bookbinding operation occur at different physically spaced locations or work stations in an assembly line. At each of these work stations, highly specialized apparatus is provided, such as a casing-in machine, building-in machine, squaring machine, etc., for performing the particular step occurring at that station. Due to the physical distance separating the various work stations, it is necessary to provide automated book-transporting apparatus at each station to enable the books to be efficiently moved to and from each machine.

Depending upon the organization of the particular bookbinding assembly line and the construction of the particular machines at the different work stations, the book-transferring devices provided at the various stations must frequently be different. For example, at one station the book may require movement in a horizontal direction, and consequently the book-transferring apparatus must be capable of horizontal transfer. At another station, the book-transferring apparatus may be required to lower books from the output of one machine at a distance substantially above the floor to the input of a subsequent machine located at a point near the floor. The book conveying apparatus may also be required to change the orientation of the book, for example turn the book end for end, from a flat position to a vertical position, etc.

In one particular bookbinding assembly line, wherein a single casing-in machine feeds a pair of building-in machines, it is necessary to transfer books which are output from the casing-in machine a substantial distance above the floor with their pages flat and backbones leading alternatively to the inputs of the two building-in machines which are nearer the floor and wherein the pages must be vertically disposed and the backbone edge lowermost. Thus, in this particular instance it is necessary to both lower the books to bring them from a high level to a low level, as well as rotate the books to change the orientation of the pages from horizontal to vertical.

In the past a number of proposals have been made for transferring books from a first upper station wherein the books are horizontal with their backbones leading alternatively to second and lower third stations wherein the books are disposed vertically with their backbones lowermost. While the various proposals have each sought to lower the books and reorient them in different ways as, for example, by dropping the books on their faces and thereafter rotating them 90° to a vertical position on their backbones, they all have had one very serious operational disadvantage. Namely, the prior book-transferring proposals have all subjected the books, particularly the backbones thereof, to impact one or more times as they are lowered from the upper position to the lower position. In some prior art proposals these impacts have been fairly substantial as where, for example, books are dropped through a distance of 24 inches directly on their backbones.

The impacts to which books have been subjected when transferred in accordance with prior art proposals have been the source of a variety of different problems. For example, because the books output from the casing-in machine are still pliable, the glue having not yet set, subjecting the books to impact causes blisters to develop. A blister is a condition wherein the end sheets of the book, to which glue has been freshly applied, partially pull away from the interior surfaces of the board which comprise the case, in effect forming an air pocket between the freshly glued end sheets and the boards of the case. Subjecting a freshly glued book to impact may also cause the end sheets to become wrinkled, detracting from the appearance of the book.

In addition to forming blisters and wrinkling the end sheets, subjecting the book to impact while still pliable is often effective to partially or totally destroy the round of the book back. Finally, subjecting a freshly glued book to impact, such as occurs when the book is dropped, not infrequently causes the book to become skewed with respect to the case, destroying the condition of parallelism between the book and the boards produced by the squaring machine.

It has been an objective of this invention to provide book-transferring apparatus for transferring books without impact from a first upper station, where the books are horizontal with their backbones leading, alternatively to second and third lower stations at each of which the books are disposed vertically with their backbones lowermost, which transferring apparatus because of its impact-free operation does not produce wrinkled end sheets or blisters, destroy the round, or introduce skewness between the pages and the boards. This objective has been accomplished in accordance with the principles of this invention by developing a unique approach to the design of book-transporting apparatus wherein in a single step books are gently lowered, reoriented, and divided into two streams.

Specifically, this objective has been accomplished by providing a pair of generally vertically disposed parallel branch conveyors each having downwardly moving, outwardly projecting fingers. The fingers engage the backbones of books transferred thereto at their upper book-receiving ends and deliver them to fixed positions on a plurality of support discs located at their respective book discharge ends, which correspond to the second and third stations. The discs are spaced to permit the fingers to pass downwardly between them subsequent to depositing a book on the upper peripheral book-receiving surfaces of the support discs. Also provided are two generally horizontal pivotal conveyors for alternatively delivering horizontally disposed books from the first station to the upper book-receiving ends of the first and second branch conveyors for subsequent deposit by the fingers at fixed positions on the book support discs. The first movable conveyor has a book-receiving end positioned at the first station and a book discharge end alternatively positioned between an upper position, and a lower position in which books are discharged to the upper book-receiving end of the first branch conveyor. The second movable conveyor has a book discharge end located at the receiving end of the second branch conveyor, and a book-receiving end. The book receiving end is alternatively positioned between an upper position, and a lower position in which books discharged from the first movable conveyor for when its discharge end is raised are conveyed to the second branch conveyor for ultimate deposit at the third station.

In operation, books are sequentially conveyed from the first station to the first movable conveyor where, as the first movable conveyor pivots between its lower and upper positions, books are transported to the first and second branch conveyors on an alternative basis for subsequent delivery by the outwardly projecting fingers to fixed positions on the support surfaces of the discs at the second and third stations as the fingers move downwardly, passing between the discs.

One of the principle advantages of the transferring apparatus of this invention, particularly the use of a plurality of spaced discs to support the books at the second and third stations, is that the discs can be mounted for rotation about their horizontal axes and provided with differently concavely contoured configurations along their perpheries. This enables the discs to be rotated, bringing different ones of the concavely configured contours uppermost, thereby enabling the book support to accommodate different thickness books having different back contours, without destroying the round therein.

It has been a further objective of this invention to provide simple positioning apparatus for advancing books horizontally from the fixed position to which they are deposited at the second and third stations to a selectively variable delivery position horizontally displaced therefrom.

This objective has been accomplished in accordance with certain additional principles of this invention by providing a pivotal lever which has driven and driving ends with a unique fulcrum which can be shifted to vary the stroke of the driving end measured from a reference or home position, and hence, the distance a book is advanced, without varying the location of the reference position. The unique fulcrum, in a preferred form, includes a pivot bar interconnecting the lever with a stationary frame which is movable relative to the frame and the lever along first and second guide paths formed in the frame and lever, which guide paths are parallel when the driving end of the lever is in its reference position.

With a pivot relatively movable in the manner described, the pivot position can be altered to vary the stroke of the book driving end of the lever, and hence, the delivery position to which the book is advanced when the driven end of the lever moves through a predetermined displacement, without varying the reference or home position of the driving end.

Preferably, the guide paths are in the form of slots in the stationary frame and lever in which the pivot or fulcrum is adapted to be selectively shiftable. The slots are parallel to each other when the lever is in its home position, thereby enabling the pivot or fulcrum to be slideably shifted in the slots to alter the stroke of the driving end without altering its home position.

An important advantage of the book-advancing apparatus described above, in addition to its ability to alter the stroke without altering the fixed or home position, is that adjustments in the stroke can be made while the positioning apparatus is in operation. This can be accomplished by merely applying a force, through a lever of other suitable means, to the fulcrum or pivot bar, sliding it in the slots, thereby altering the effective pivot point of the lever.

Other features and advantages and objectives of this invention will become apparent from a detailed description of a preferred embodiment of the invention in which:

FIG. 1 is a front elevational view of the preferred embodiment of the transferring apparatus of this invention.

FIG. 1A is a top plan view taken along line 1A–1A of FIG. 1.

FIG. 2 is an enlarged front elevational view of the book gates.

FIG. 2A is an enlarged view of the book gate actuating means.

FIG. 3 is an enlarged front elevational view of the branch conveyors and book supports.

FIG. 4 is a side elevational view of the transferring apparatus of this invention taken along line 4–4 of FIG. 1.

FIG. 5 is a cross-sectional view taken along line 5–5 of FIG. 4.

FIG. 6 is a cross-sectional view taken along line 6–6 of FIG. 5.

FIG. 7 is a cross-sectional view taken along line 7–7 of FIG. 5.

FIG. 8 is a cross-sectional view taken along line 8–8 of FIG. 4.

FIG. 9 is a cross-sectional view taken along line 9–9 of FIG. 8.

FIG. 10 is a cross-sectional view along line 10–10 of FIG. 8.

FIG. 11 is a cross-sectional view taken along line 11–11 of FIG. 8.

FIG. 12 is a cross-sectional view taken along line 12–12 of FIG. 8.

Figure 13:
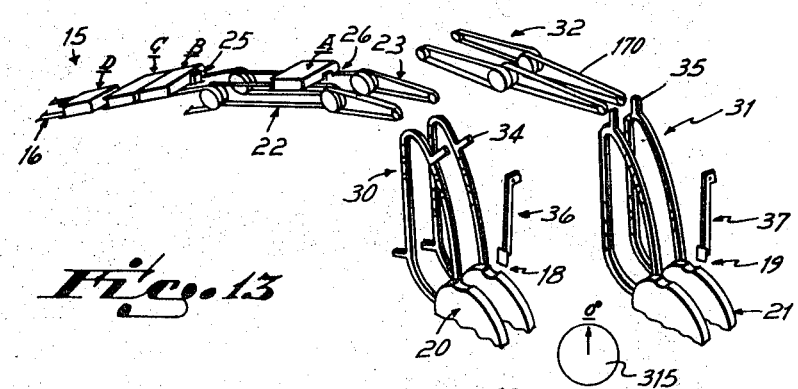

FIGS. 13—24 are schematic views in perspective of the transferring apparatus of this invention showing the relative positions of books being transferred by the apparatus and the various operating components of the apparatus at different points in an operational cycle.

GENERAL DESCRIPTION

The transferring apparatus of this invention, which is shown in FIG. 1, is adapted to transport books from a first upper station 15, to which books disposed flat with their backbones leading are fed on an approach conveyor 16, alternatively to fixed positions at second and third lower stations 18 and 19 where the books are deposited in a vertical position with their backbones lowermost and in contact with book supports 20 and 21. The apparatus of this invention is further adapted to transport the books deposited at the fixed positions of the second and third lower stations 18 and 19 to selectively variable delivery positions displaced therefrom in the horizontal direction.

Transport of books from the first upper station 15 to the fixed positions at the second and third lower stations 18 and 19 is accomplished by means which include an intermediate conveyor 22 which is adapted to transfer books from a slower moving approach conveyor 16 to a first movable conveyor 23 selectively shiftable between a lower position (solid lines) and an upper position (phantom lines). Cooperating with the approach and intermediate conveyors 16 and 22 are a first book gate 25 and a second book gate 26 which stop books moving on the approach and intermediate conveyors 16 and 22, releasing them at timed points in the operational cycle of the apparatus for continued movement to the movable conveyor 23.

Associated with the first movable conveyor 23 is a second movable conveyor 32. Conveyor 32, like conveyor 23, is selectively movable between a lower position (phantom lines) and an upper position (solid lines). Movable conveyors 23 and 32 are operative in combination to alternatively transfer books from the intermediate conveyor 22 to a first and a second branch conveyor 30 and 31 for ultimately deliverying the transferred books to the fixed positions at stations 18 and 19.

The branch conveyors 30 and 31 are generally vertically disposed having upper book-receiving ends for receiving books from the free or discharge ends of the movable conveyors 23 and 32, and lower discharge ends for deliverying books to the fixed positions at the stations 18 and 19. The branch conveyors 30 and 31 include fingers 34,34 and 35,35 which are adapted to contact the backbone of a book for temporarily supporting the book as the finger moves downwardly, eventually depositing the book at fixed positions on the supports 20 and 21.

Located at the lower stations 18 and 19 are pusher assemblies 36 and 37. The pusher assemblies 36 and 37 are operable to advance books positioned by fingers 34 and 35 at fixed positions on supports 20 and 21 of the lower stations 18 and 19 to selectively variable delivery positions displaced therefrom in a horizontal direction.

Suitable timed actuating means are provided for operating in timed relation the gates 25 and 26, the movable conveyors 23 and 32, the fingers 34 and 35, the pusher assemblies 36 and 37, and the various other conveyors of the transferring apparatus.

In operation, books positioned on the approach conveyor 16 disposed flat with their backbones leading are advanced to the first book gate 25 where they are stopped, and thereafter selectively released in series fashion. Considering a single book, a book is advanced to the first gate 25 where it is stopped until the gate is opened by the timed-actuating means. Upon opening of the first gate 25, the book is released whereupon it moves from the approach conveyor 16 to the intermediate conveyor 22. The released book continues advancing on the intermediate conveyor 22 until it arrives at the second book gate 26 whereupon its motion is again arrested should it arrive prematurely. At the proper instant, as determined by the timed-actuating means, the second book gate is opened, releasing the book, should it have arrived prematurely, whereupon it then moves to the first movable conveyor 23. If the book arrives at gate 26 on time, it moves uninterrupted past the gate.

Assuming the first and second movable conveyors 23 and 32 are in the position shown in solid lines in FIG. 1 when the released book reaches the movable conveyor 23, the book, upon release by the gate 26 and transfer to the first movable conveyor 23, is advanced to the branch conveyor 30. When the backbone of the book reaches the free end of the movable conveyor 23, it is transferred to the branch conveyor 30 where the finger 34, disposed as shown in FIG. 1, engages the backbone, temporarily supporting the book. Subsequent to engagement of the backbone of the book with finger 34, the finger moves downwardly simultaneously lowering and rotating the book approximately 90°. When the finger 34 supporting the book reaches the book support 20, the book is gently transferred to the fixed position at the station 18, where it is vertically disposed with its backbone lowermost.

At this point, a book has been transferred from a first upper station 15 where it is horizontally disposed with its backbone leading, to a fixed position at a second lower station 18 where it is vertically disposed with its backbone lowermost. Subsequently, the pusher assembly 36, which is operated by the timed-actuating means, urges the book in the horizontal direction, moving it from the fixed position to which it is deposited by finger 34, to a selectively variable position, horizontally displaced therefrom.

As subsequent books are each successively released by the gages 25 and 26, the first and second movable conveyors 23 and 32 are alternatively simultaneously shifted at the appropriate times between their upper and lower positions on a sequential basis. The sequential shifting of the disposition of the movable conveyors 23 and 32 successively transfers the released books alternatively to the fingers 34 and 35 of the first and second branch conveyors 30 and 31 for delivery to the fixed positions of the book supports 20 and 21 of the second and third stations 18 and 19. Upon delivery of the books to fixed positions at the stations 18 and 19, the pusher assemblies 36 and 37 operated by the timed-actuating means, advance the books to their respectively associated delivery positions horizontally displaced therefrom. When the apparatus successively transfers a total of four books, a full cycle of operation is complete.

DETAILED DESCRIPTION

The transferring apparatus of this invention, considered in more detail, includes a frame generally indicated by the reference numeral 10, having two vertically disposed spaced parallel walls 10A and 10B which are secured in their operative positions by a plurality of transversely disposed brackets (not shown).

The approach conveyor 16 includes a conveyor belt 50 driven by means (not shown) and adapted to train at its right-hand end, as viewed in FIG. 1, over a segmented idler roll 52A, and at its left-hand end (not shown) over a suitable drive pulley. The idler roll 52A is mounted for rotation about a horizontal axis normal to the frame wall 10A by suitable means, such as, a shaft 53 anchored at its inner end to the frame 10. As those skilled in the art will understand the conveyor belt 50 preferably includes a plurality of spaced belts of relatively narrow width as illustrated in the preferred embodiment.

The intermediate conveyor 22 includes a conveyor belt 55 which, like the conveyor belt 50, preferably is fabricated of a plurality of narrow belts. The conveyor belt 55 at its left end trains over the segmented idler roll 52B and at its right end trains over a drive roll 56 which drives it at a speed faster than conveyor belt 50. Segmented idler rolls 52B are interleaved with segmented idler rolls 52A, and independently rotatably mounted to enable conveyor belts 16 and 55 to move at different speeds. The drive roll 56 is mounted for rotation with a shaft 57 which is journaled in the frame 10 and adapted to be driven by a sprocket 58 (FIG. 5) by suitable timed-actuating means to be described. The intermediate conveyor 22 further includes a second conveyor belt 59 which trains at its left-hand end over the drive roll 56 and at its right-hand end over an idler roll 60A. Roll 60A is mounted for rotation about shaft 61 journaled in the frame 10.

The book gate 25 includes a generally vertically disposed stop arm 65 which is constrained against horizontal movement by a stationary horizontal lug 66 secured at its inner end to the frame 10. The stop arm 65 is normally held in in its book-stopping position as shown in FIG. 2 by a spring 64 having its upper end secured to a stationary horizontal pin 67 projecting from the frame 10, and its lower end connected to the angulated lower end of the stop arm 65.

Downward movement of the stop arm 65 to a position in which its upper end is positioned below the upper reach of the conveyor 50 is provided by a linkage mechanism which includes a bellcrank 70 mounted for movement about a fixed pivot 71 projecting horizontally from the frame 10. The bellcrank 70 has a generally vertical arm 72 and a generally horizontal arm 73. The horizontal arm 73 at its outer end passes through a vertical slot 74 formed in the stop arm 65 and is provided with a pair of spaced pins 75 which constrain movement of the slotted portion of the stop arm 65 relative to the outer end of the arm 73 in all directions except perpendicularly. Stated differently, the pins 75 limit the relative movement of the slotted portion of the stop arm 65 to generally vertical sliding movement with respect to the outer end of the bellcrank arm 73.

Pivoting the bellcrank 70 in a clockwise direction about the fixed pivot 71 is accomplished by a link 77 pinned at one end to the outer end of the bellcrank arm 72, and pinned at its outer end to link 78. Link 78 in turn is mounted for pivotal movement with a shaft 79 transversely supported for rotation about its axis by the frame 10. A link 80 having its upper end fixedly secured to the shaft 79 rotates the shaft 79, in turn pivoting the link 78 in response to movement of a link 81 pinned at its upper end to the lower end of the link 80. The link 81 has its lower end pinned to an intermediate portion of a link 82, the upper end of which is mounted for rotation about a stationary pin 76 projecting from the frame 10 (FIG. 2A). Secured to the lower end of link 82 is a cam follower wheel 83 which cooperates with a cam 84 having oppositely disposed lobes 85,85. The cam 84 is mounted for rotation with a shaft 87 transversely journaled in the frame 10. The shaft 87 is driven by the timed-actuating means to be described.

In operation, rotation of the cam 84 by the shaft 87 causes the cam follower wheel 83 to move radially outwardly in response to the engagement thereof with one of the lobes 85,85. Outward movement of the cam follower wheel 83 pivots the link 82 about the stationary pivot pin 76 driving the link 81 in the direction of arrow 88. Movement of link 81 in the direction of arrow 88 pivots the link 80 clockwise, in turn driving the shaft 79 clockwise. Clockwise movement of the shaft 79 pivots the link 78 about its lower end, moving the link 77 in the direction of arrow 89. Movement of link 77 in the direction of arrow 89 pivots the bellcrank 70 clockwise about the fixed pivot 71, driving the stop arm 65 downwardly to release the book. Release of the book enables it to again be driven by conveyor belt 50. Although engagement of the cam follower 83 and the lobe 85 only causes the stop arm 65 to be driven downwardly for a brief interval, which interval is less than the time necessary for the trailing edge of the book to clear the stop arm, the stop arm remains depressed so long as any portion of the book overlies the upper end thereof. The slot 74 permits the stop arm 65 to be held in its depressed position by a released book when the bellcrank arm 73 has returned to its upper position in response to disengagement of the cam lobe 85 and the cam follower wheel 83.

The book gate 26 includes an angulated stop arm 90 having an upwardly extending portion 91 adapted to engage the leading edge of a book when it its upper position depicted in FIG. 2. The stop arm 90 is integral with a link 92, the opposite end of which is mounted for movement about shaft 79. A compression spring 93 biases the stop arm 90 counterclockwise about the shaft 79 to the position shown in FIG. 2, further counterclockwise movement being prevented by abutment of stop arm 90 with a stationary lug 94 secured to the frame 10. The spring 93 has its upper end connected to the stop arm 90, and its lower end connected to a free end of a link 96. The other end of link 96 is mounted for rotation with the shaft 79.

In operation when one of the cam lobes 85,85 engages the cam follower wheel 83, pivoting the wheel link 82, moving the link 81 in the direction of arrow 88 and pivoting the shaft 79 in a clockwise direction, the link 96 pivots clockwise with the shaft 79. Clockwise movement of the link 96 causes it to abut a pin 86 secured to link 92 and thereby lower the stop arm 90, driving the upstanding end portion 91 below the belt 59. Downward movement of the upstanding end portion 91 of stop arm 90 releases the book, enabling it to again be driven by the belt 59. Although the upstanding end portion 91 of the stop arm 90 is only held in its lower position by the interaction of the cam lobe 85 and the cam follower wheel 83 for a brief interval, which interval is less than the interval required to move the book formerly held by the upstanding portion of the stop arm clear of the stop arm, the stop arm is maintained depressed so long as any portion of the released book overlies the upstanding end 91 of the stop arm. When the trailing edge of the book has cleared the upstanding portion 91 of the stop arm 90, the spring 93 elevates stop arm portion 91 to its normal position.

The book gate 26 serves to insure that books released by the book gate 25 arrive at the first movable conveyor 23 in proper timed relation relative to the movements of the various components of the transferring apparatus. The conveyor belts 55 and 59 operate at a faster speed than the conveyor belt 50, and therefore the delay between the release of a book by the gate 25 and the arrival of a book at the gate 26 depends upon the size of the book, the delay being greater for books having greater included dimensions between the front and backbone thereof. To accommodate different size books and still maintain the proper timing of the arrival of books at a movable conveyor 23 without making adjustments in the apparatus, it is necessary to use two book gates, one on the slow conveyor and one on the fast conveyor.

The first movable conveyor 23 includes a conveyor belt 100 which trains over an idler roll 101, and a drive roll 60B. Drive roll 60B is mounted for rotation with shaft 61 which is journaled in frame 10 and driven by sprocket 62. The idler roll 101 is mounted for rotation about a shaft 102 secured to a subframe 103. The subframe is journaled for pivotal movement about the shaft 61 in response to movement of a link 105 pinned to an extension 106 of the subframe. The link 105 is pinned to the lower extremity of an approximately C-shaped link 107 (FIG. 2A). The link 107 is pinned at its upper free end to the stationary shaft 76. Intermediate the upper and lower ends of the link 107, a cam follower wheel 108 is pinned. The cam follower wheel 108 cooperates with a cam 109 mounted for rotation with the shaft 87. The cam 109 has a lobe 110 configured to pivot the movable conveyor 23 to the downward position shown in solid lines in FIG. 1 for transferring a book to the first branch conveyor 30.

In operation, when the shaft 87 rotates the cam 109 to a position in which the lobe 110 contacts the cam follower 108, the link 107 is pivoted clockwise about the stationary shaft 76, moving the link 105 in the direction of arrow 112. Movement of the link 105 in the direction of arrow 112 pivots the extension 106 of the subframe 103 in the clockwise direction about the shaft 61, in turn pivoting the movable conveyor 23 from the upper position shown in phantom lines to the lower portion shown in solid lines. In the lower position, books released by the gate 26 are transferred by the intermediate conveyor 22 and movable conveyor 23 to the first branch conveyor 30, the finger 34 of which engages the backbone of the book temporarily supporting the book while it is lowered to the second station 18. When the movable conveyor 23 is in its upper position shown in phantom lines in FIG. 1, books released by gate 26 are transported to the second movable conveyor 32 for subsequent delivery to the third station 19 via the second branch conveyor 31.

The second movable conveyor 32 includes a conveyor belt 111 which, like the other conveyor belts, preferably is fabricated a plurality of narrow belts. The conveyor belt 111 at its left-hand end trains over an idler roll 113 mounted for rotation on a shaft 114 secured to the free end of a subframe 115. The subframe 115 is journaled for rotation about a drive shaft 116 journaled to the frame 10. The conveyor belt 111 at its right-hand end trains over a drive roll 104 mounted for rotation with the drive shaft 116. The subframe 115 includes an extension 117 which is adapted to be pivoted when acted upon by link 118, pivoting the movable conveyor 32 between an upper inoperative position depicted in solid lines in FIG. 1 and, a lower operative position depicted in phantom lines. In the lower position, the conveyor 32 is adapted to receive books transferred from the movable conveyor 23 when the later is in its upper position.

The link 118, which at its upper end is connected to the extension 117 of the subframe 115 is at its lower end pinned to an intermediate portion of a link 120. The link 120 has its upper end pinned to the frame 10. The lower free end of the link 120 has a cam follower wheel 121 pinned thereto which cooperates with a cam 123 mounted for movement with a shaft 125 journaled in the frame 10 and adapted to be driven by the timed-actuating means to be described. The cam 123 is provided with a lobe 124 configured to pivot the link 120 and in turn the subframe 115, and hence the movable conveyor 32, once per revolution of the cam. The relationship of the cam lobe 124 of cam 123 and the cam lobe 110 of cam 109 is such that the movable conveyors 23 and 32 simultaneously move, on an alternative basis, to either the solid line position or the phantom line position depicted in FIG. 1.

The first branch conveyor 30 includes a plurality of chains 140 which at their upper ends train over a plurality of spaced idler sprockets 141 journaled for rotation about a transversely disposed shaft 142 secured to and projecting from the frame 10. Chains 140 at their lower ends train over a plurality of spaced drive sprockets 143 mounted for rotation with the shaft 87. A chain guide plate 145 stationarily mounted to the frame 10 supports a portion of each of the chains 140 guiding them through the arcuate path shown. Fingers 34,34 having their inner ends secured to the chains 140 extend from the chains and are supported in an extended position by links 150,150 which have one of their ends connected to the chain 140 and the other of their ends connected to the chain 140 and the other of their ends connected to an intermediate portion of the fingers.

Support rolls 149 journaled about the shaft 142 are integral with and driven by idler sprocket 141. Rolls 149 support a book as it is transferred from the free end of movable conveyor 23 to the finger 34 prior to lowering the book onto the support 20 at station 18.

A movable book guide 147 having an outer guide 147 having an outer guide surface 148 is provided for altering the path which a book temporarily supported by one of the fingers 34,34 passes through as it is transferred from the movable conveyor 23 to a book support 20 of the station 18. the book guide 147 is provided with a slot 146 which engages a stationary pin 151 projecting from the chain guide 145.

In practice the book guide 147 is pivoted such that the lower end of the guide surface 148 is spaced from a fixed gage line 160 by a distance corresponding to the thickness of the book, that is, the included dimension between the exterior surfaces of the covers. Thus, by altering the position of a book guide 147 it is possible to deposit books regardless of their thickness with their right-hand cover aligned with the gage line 160. As the thickness of the book increases, the book guide 147 is pivoted clockwise about the stationary pivoting pin 151 enabling the right-hand book cover to be positioned in contact with a stationary vertical guide wall 162 coinciding with the gage line 160.

Associated with the adjustable book guide 163 at its lower end is pinned to a link 164 which in turn is pivotally mounted about a stationary pin 168. The pivotal link 164 enables the book guide 163 to be positioned such that its link book guide surface 165 can be disposed parallel to the book guide surface 148 of the book guide 147 and spaced therefrom at different distances to accommodate different thickness books. The inner surface 165 of book guide 163 in combination with the book guide surface 148 of the book guide 147 forms a channel through which a book to be positioned on the support 20 travels as it is temporarily supported by the finger 34 in its downward movement. A third book guide 166 vertically disposed and coincident with the gage line 160 is provided to guide the right-hand cover of the book as it nears the book support 20 in the course of delivery by fingers 34,34.

The second movable conveyor 32 includes a conveyor belt 170 which at its right-hand end trains over an idler roll 171 journaled on a shaft 172 which is transversely disposed and secured at its inner end to a stationary subframe 173 mounted on frame 10. The conveyor 170 at its other end trains over the driven drive roll 104. A plate 174 secured to the subframe 173 underlies and supports the upper reach of conveyor belt 170.

The second branch conveyor 31 includes a plurality of drive chains 176 which at their upper ends train over idler sprockets 177 mounted for rotation about a stationary shaft 178 transversely disposed and secured at its inner end to frame 10. The chains 176 at their lower ends train about drive sprockets 179 mounted for movement with driven shaft 125.

A generally vertically disposed chain guide 180 stationarily mounted to the frame 10 is provided having an outer surface which underlies the chains 176 for guiding a portion thereof in an arcuate path. Secured to the chains 176 are fingers 35,35 projecting outwardly. Fingers 35,35 are supported in an extended position by links 183,183 which at their inner ends are connected to the chains and at the outer ends are connected to intermediate portions of the fingers. A plurality of guide rolls 191 mounted for rotation about the shaft 178 are provided for supporting and guiding books as they are transferred from conveyor belt 170 to the fingers 35.

A stationary book guide 186 having an outer guide surface 187 is provided for guiding the books as they are lowered by the fingers 35,35 in the course of being transferred from the conveyor 170 to a book support 21 of station 19. The lower portion of the book guide surface 187 coincides with a stationary gage line 190. Suitable means (not shown) corresponding to the book guide 163 are provided for assisting in the guidance of a book as it is lowered by the finers 35,35 to the support 21. Movement of the guide means (not shown) corresponding to the guide means 163 between an inner position adjacent guide surface 187 and an outer position spaced further therefrom provide an adjustable channel for guiding and accommodating different thickness books as they are lowered by fingers 35,35 to support 21. A vertical guide plate 195 similar in function to the guide plate 166 is also provided. The position of guide plate 195 relative to the fixed guide surface 187 is adjustable to accommodate different thickness books.

The book support 21 includes a plurality of discs 200A, 200B, 200C and 200D coaxially mounted on a transversely disposed shaft 201 which is rotatably supported by journal blocks 203 and 204. The peripheries of discs 200A, 200B, 200C and 200D are provided with a plurality of aligned segments 210A—210D, 211A—211D, etc. The aligned segments 210A—210D, 211A—211D, etc., are provided with differently concavely configured book back engaging surfaces S1A to S1D, S2A to S2D, etc., adapted to intimately contact the rounded backs of different thickness books which are deposited on the book support 21 with their book backs lowermost. The concavity enables the book to be supported without destroying its round.

The leftmost extremity 215A—215D, 216A—216D, etc., of the book back surfaces S1A to S1D, S2A to S2D, etc. are aligned with the gage line 190 when the respective book back engaging surfaces are located uppermost. For example, the leftmost extremity 215A—215D of the surfaces S1A to S1D, respectively, are aligned with the gage line 190 when surfaces S1A to S1D are uppermost, that is, in a position to receive a book deposited at station 19 by branch conveyor 31. Similarly, the leftmost extremity 216A—216D of surfaces of S2A to S2D are aligned with the gage line 190 when the surfaces S2A to S2D are uppermost to receive a book deposited at stations 19 by branch conveyor 31.

The discs 200A, 200B, 200C and 200D are spaced from each other at distances sufficient to permit the chains 176 and the fingers 35,35 carried thereon to pass therebetween in the course of depositing a book at the station 19 with its back in contact with the uppermost aligned book-back-engaging surfaces of the discs. This enables the book to be gently deposited on the uppermost support surface of the discs 200A and 200D with its backbone lowermost without having mechanical interference between the fingers 35,35 which lower the books and the discs 200A—200D which support the book.

To enable the angular position of the discs 200A—200D to be altered to bring different ones of the surface S1A to S1B, S2A to S2D, etc. to the upper book-back-engaging position, suitable crank means (not shown) are provided for engaging an end 219 of the shaft 201. Movement of the crank means rotates the shaft 201, in turn altering the angular position of discs 201A—201D, and bringing different ones of the surfaces S1A to S1D, S2A to S2D to the uppermost position for accommodating different thickness books without destroying the round therein.

To enable the discs 200A—200D to be simultaneously raised or lowered as may become desirable in use, a pair of screws 220,220 threadable in the journal blocks 203,203 are provided. The upper ends of the screws 220,220 are provided with shafts 221,221 rotatable in a stationary journal block 223 transversely disposed between the frame walls 10A and 10B. The shafts 221,221 have upper and lower radially extending shoulders 224,224 and 225,225 for preventing vertical movement of the shafts relative to the block 223. Upwardly extending from the shafts 221,221 are square cross section portions 226,226 which are adapted to interfit in suitably configured holes in cranks (not shown). A chain 227 trained over sprockets 228,228 (FIG. 5) secured to threaded shafts 221,221 is provided to gang the movement of the threaded shafts 221,221.

In operation the blocks 203 and 204 which are vertically, slidably mounted to the frame walls 10A and 10B, respectively, are raised and lowered in unison by rotating one or the other of the extensions 226,226 of the shafts 221,221. Vertical movement of journal blocks 203 and 204 in turn imparts vertical movement to shaft 201, and hence to the discs 200A—200D, altering the vertical position of the surfaces S1A to S1D, S2A to S2D, etc.

The book support 20 is substantially identical to the book support 21, except that the rightmost extremities 230A—230D, 231A—231D, etc. of peripheral book-back-engaging surfaces SS1A to SS1D, SS2A to SS2D, etc. respectively, are adapted to become aligned with the gage line 160 when positioned uppermost. In all other respects book support 21 is identical to book support 20. Therefore, a further description of the support 21 is unnecessary.

The pusher assemblies 36 and 37, which advance books deposited in fixed positions on the book supports 20 and 21, respectively, to selectively variable delivery points, are identical in structure and operation. Consequently, a description of the pusher assembly 37 is sufficient to fully describe the structure and operation of both of the pusher assemblies. The pusher assembly 37, considered in more detail, includes a bellcrank 263A mounted for pivotal movement about a pin 264A stationarily secured relative to the frame wall 10A by a bracket 265A. The bellcrank 263A includes a lower arm 267A having a book engaging surface 268A which is adapted to move from a fixed position shown in FIG. 12 to a selectively variable delivery position.

The bellcrank 263A further includes an upper arm 266A which is pinned to a vertically movable pusher rod 250A. The rod 250A is normally biased to its uppermost position by a compression spring 260A positioned between a collar 261A secured to the pusher rod 250A and a stationary horizontal plate 253A which spans spaced stationary vertical plates 254 and 255 disposed between the frame walls 10A and 10B by transverse shafts 256 and 257. The lower end of the pusher rod 250A passes through an aperture 251A formed in the horizontal plate 253A and is pinned between the driving ends 241A of a pair of parallel levers 240A, the other ends 242A of which are driven. An actuator or cam 245 mounted for rotation with the shaft 125 is provided. The cam 245A has lobes 246A and 247A which cooperate with a cam follower wheel 243A pinned between the driven ends of parallel levers 240A and functions to drive the driven ends 242A of the lever ends 240A through a predetermined displacement between initial and terminal positions.

A pivot selectively slidable in guide paths or slots 271A and 272A formed in side plates 254 and 255, and the levers 240A, respectively, is provided to enable movement of the driven ends 242A of levers 240A through a predetermined displacement to impart selectively variable movement to the driving ends 241A of levers 240A, and in turn to the pusher rod 250A, and hence, to the book engaging plate 268A of the bellcrank arm 267A. Pivot 270A is in the form of a rod or bar transversely disposed in the slots 271A and 272A of the plates 254, 255, and the levers 240A, respectively.

An angulated pair of parallel links 280A pinned at their right-hand ends, as viewed in FIG. 8, between the plates 254 and 255 and by the plate mounting shaft 256 and at their left-hand ends by the pin 244A passing through the cam follower wheel 243A and the driven ends 242A of the pair of parallel lever 240A is provided. The links 280A constrain movement of the cam follower wheel 243A in an arc centered on the shaft 256.

In operation, after shaft 125 rotates the cam 245A through a complete revolution, the driven ends 242A of levers 240A are moved up and down through a predetermined displacement having an initial position defined by engagement of the cam lobe 246A and the cam follower wheel 243A, and a terminal position defined by engagement of the cam lobe 247A and the cam follower wheel 243A. Movement of the driven ends 242A of the parallel levers 240A from the initial position to the terminal position, which occurs during the first 180° of rotation of the cam 245A, is effective to move the driving ends 241A downwardly, as viewed in FIG. 8, in turn, moving the pusher rod 250A downwardly. Downward movement of the pusher rod 250A pivots the bellcrank 263A, moving the book-engaging plate 268A on bellcrank arm 267A from the fixed position depicted in FIG. 12 to a selectively variable position. The displacement between the fixed position of the book-engaging plate 268A depicted in FIG. 12 and the selectively variable delivery position depends upon the position of the fulcrum 270A in the slots 271A and 272A, the displacement being greater as the fulcrum 270A is moved further from the driving ends 241A of the levers 240A. As the cam 245A moves through the remaining 180° of a complete revolution, the driven ends 242A of the levers 240A return to their lowermost position depicted in FIG. 8, in turn returning the book-engaging plate 268A from the selectively variable delivery position to the fixed position shown in FIG. 12.

To enable the position to which the book-engaging plate 268A is returned at the conclusion of each book-pushing cycle to be fixed and independent of the delivery position, the slots 271A and 272A are each disposed such that when the levers 240A are in the home, retracted or rest position shown in FIG. 8 corresponding to the book-engaging plate position shown in FIG. 12, the slots 271A and 272A are parallel. With the slots 271A and 272A so disposed, when the levers 240A are in the position shown in FIG. 12, movement of the fulcrum 270A in the slots 271A and 272A is ineffective to alter the position of the levers 240A, and hence of the the plate 268A secured to the bellcrank arm 267A. While movement of the fulcrum 270A in the slots 271A and 272A is ineffective to alter the position to which the plate 268A is returned when the cam lobe 246A is positioned as shown in FIG. 8, altering the position of the fulcrum 270A is effective to alter the position to which plate 268A is advanced when the cam 245A is rotated to a point such that lobe 247A is engaged with the cam follower wheel 243A. As fulcrum 270 is moved from the position shown in FIG. 8 to variable positions in slots 271A and 272A, the delivery position to which the plate 268A is moved varies, becoming less displaced from the fixed plate position shown in FIG. 12 as the fulcrum 270A is moved further from the position shown in FIG. 8.

Components of the pusher assembly 36 identical to those of the pusher assembly 37 bear the same reference numerals, the suffix letter "A" being changed to the letter "B."

To alter the position of fulcrums 270A and 270B a gang bar 290 is provided which is connected at its ends to fulcrums 270A and 270B. Gang bar 290 is adapted to be shifted in the direction of arrow 291 to alter the position of fulcrums 270A and 270B in slots 271A and 271B, and 272A and 272B, respectively, by a screw assembly 292. The screw assembly 292 includes a threaded shaft portion 293 threadable in an aperture formed in a block 293 secured to the gang bar 290. The screw assembly 292 further includes a pair of spaced collars 295 and 296 disposed on opposite sides of a stationary journal block 297 which is secured to the plates 254 and 255. The collars 295 and 296, in combination with the journal block 297, prevent axial movement of the threaded portion 294 of the screw assembly 292.

Meshing bevel gears 298 and 299 secured to the collar 296 and to a shaft 300, respectively, are also included in the screw assembly 292. The shaft 300 is journaled in the plate 254 and is connected to a crank 301. Rotation of the crank 301 rotates the shaft 300, the bevel gears 298 and 299, and the threaded portion 294 of the screw assembly 292, in turn, advancing or retracting the block 293. Movement of block 293 moves the gang bar gang bar 290 in the direction of arrow 291, imparting identical positioning movement to the fulcrums 270A and 270B, in turn identically altering the displacement of the delivery position to which the plates 268A and 268B are advanced relative to the fixed plate position depicted in FIG. 12.

An important advantage of the pusher assemblies 36 and 37 of this invention is that the delivery point to which the plates 268A and 268B advance a book deposited on the supports 20 and 21 by the fingers 34 and 35 can be altered while the transferring apparatus is operating. Specifically, the crank 301 may be turned to alter the position of the fulcrums 270A and 270B while the cams 245A and 245B are rotating. Hence, the position to which a book is delivered by the pusher assemblies 36 and 37 may be adjusted without interrupting the operation of the book-transferring apparatus.

Timed-actuating means are provided for rotating the shafts 87 and 125, and the conveyor drive rolls 56, 60 and 104 in a predetermined timed relationship for effecting the movement of the various operating components at predetermined times throughout an operational cycle. The timed-actuating means includes a motor driven main drive sprocket 315 keyed to a shaft 316 journaled in the frame 10, and two secondary drive sprockets 318 and 319. The sprockets 318 and 319 are drivingly connected to the shafts 87 and 125 via slip friction clutches 314 (FIG. 7) which are operative to engage the respective sprockets and shafts at only one relative angular position. The slip friction characteristic of the clutch 314 is desirable to enable the various operating components driven from the sprockets 318 and 319 to stop should any portion of the transferring apparatus become jammed. The one-point angular engagement characteristic of the clutches 314 which interconnect the shafts 87 and 125 with the sprockets 318 and 319, respectively, enables a driving connection between the respective sprockets and shafts to exist at only one relative angular position. This preserves the timed operation of the various components of the apparatus relative to each other when the apparatus, should it become jammed, is again operating properly.

Trained over the sprockets 315, 318 and 319 is a main drive chain 320 for imparting motion from the motor-driven sprocket 315 to the secondary sprockets 318 and 319. Preferably the sprockets 315, 318 and 319 have the same diameter thereby providing a 1:1 ratio between their respective angular motions. The shaft 87 which is driven by the sprocket 318 provides operating motion for the chains 140 which drive the fingers 34,34 of the first branch conveyor 30, as well as for the cam 84 which operates the book gates 25, 26, the cam 109 which pivots the first movable conveyor 23, and the cam 245B which operates the pusher assembly 36. The shaft 125 which is driven by the sprocket 319 imparts driving motion to the chains 176 which carry the fingers 35,35 of the second branch conveyor 31, as well as impart driving motion to the cam 123 which pivots the second movable conveyor 32, and the cam 245A which operates the pusher assembly 37.

The timed-actuating means further includes a secondary chains 310 and 321. The secondary chain 310 trains over a drive sprocket 311 nonrotatably secured to shaft 87 and sprockets 58 and 62 of conveyor shafts 57 and 61, respectively. A suitably rotatably mounted idler sprocket 322 maintains the chain in engagement with the sprockets. The secondary drive chain 321 trains over a drive sprocket 312 nonrotatably secured to shaft 125 and a driven sprocket 313 carried on the conveyor drive shaft 116. A suitably rotatably mounted idler sprocket 325 maintains the chain in engagement with the sprockets. The secondary drive chain 310 drives conveyor belts 55 and 59, and belt 100 via sprockets 58 and 62, respectively. The drive chain 321 via the drive sprocket 313 drives the conveyor belts 111 and 170.

OPERATION

A complete operational cycle of the preferred embodiment of this invention includes the transfer of four books, sequentially fed to the first upper station 15 by the approach conveyor 16, alternatively to selectively variable delivery positions at the second and third lower stations 18 and 19. The transfer of the four books occurs in two steps. The first step involves transferring the books from the upper station 15 to fixed positions on the supports 20 and 21 at lower stations 18 and 19, the transfer being on an alternate basis via the movable conveyors 23 and 32 and the fingers 34 and 35 of the branch conveyors 30 and 31. The second step involves transferring each of the two books deposited at the lower stations 18 and 19 from the fixed position on the supports 20 and 21 to which they are delivered by the fingers 34 and 35 to a selectively variable delivery position horizontally displaced therefrom, the transfer from the fixed position to the selectively variable delivery position being produced by the pusher assemblies 36 and 37.

A complete operational cycle of the transfer apparatus of this invention resulting in the transfer of four books from the first upper station 15 to selectively variable delivery positions at the second and third lower stations 18 and 19 is described in conjunction with FIGS. 13—24. These FIGS. show the positions the four books assume relative to each other and to the various components of the apparatus, as the books are transferred. At the start of the operational cycle, it is assumed that the four books A, B, C and D, as well as the various operating como components of the apparatus are disposed as depicted in FIG. 13. At this point in the cycle the first book A has been gated by gate 25 and transferred to the intermediate conveyor 22 where it is held by gate 26 subject to being released immediately. Book B is on the approach conveyor 16, its motion arrested by gate 25. Books C and D are also on the approach conveyor 16, but spaced in some random fashion behind book B. The movable conveyors 23 and 32 are in their lower and upper positions, respectively, for transferring a book to the first branch conveyor 30. The fingers 34 and 35 of the branch conveyors 30 and 31 are disposed as shown the arrow on the main drive sprocket 315 is in z a zero angular position, corresponding to the start of an operational cycle.

Figure 14:
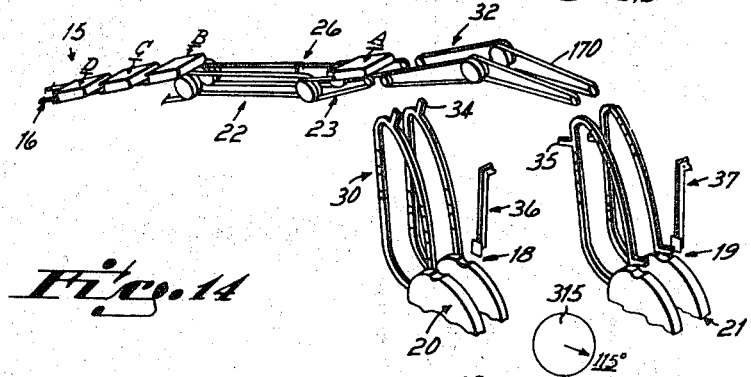

As the main sprocket 315 begins rotating from its zero angular position (FIG. 13) one of the lobes 85 of the cam 84 engages the cam follower wheel 83, actuating the gates 26 and 25 releasing books A and B, respectively. As the main drive sprocket 315 continues rotating, books A and B are conveyed to points beyond the gates 26 and 25, respectively. When the main drive sprocket 315 has rotated through an angle of 115°, the lobes 110 and 124 of cams 109 and 123 are no longer in contact with the cam follower wheels 108 and 121, respectively, causing the movable conveyors 23 and 32 to move to their upper and lower positions, respectively. At this point in the operational cycle, which is depicted in FIG. 14, book A has advanced to a position where its leading backbone edge is approximately at the junction of the movable conveyors 23 and 32; book B has advanced to a position where it is partially on the intermediate conveyor 22, but has not yet reached the book gate 26; and books C and D are on the approach conveyor 16 with the leading backbone edge of book C possibly held by the gate 25, depending on the extent to which it was initially displaced from the trailing edge of book B at the beginning of the operational cycle. As main sprocket 315 continues rotating, book A continues to advance, transferring from movable conveyor 23 to movable conveyor 32. Book B also continues to advance until it reaches the book gate 26 where it is held until released at the proper time by the interaction of the cam 84 and the cam follower 83 whereupon it is released and transferred to the movable conveyor 23.

Figure 15:
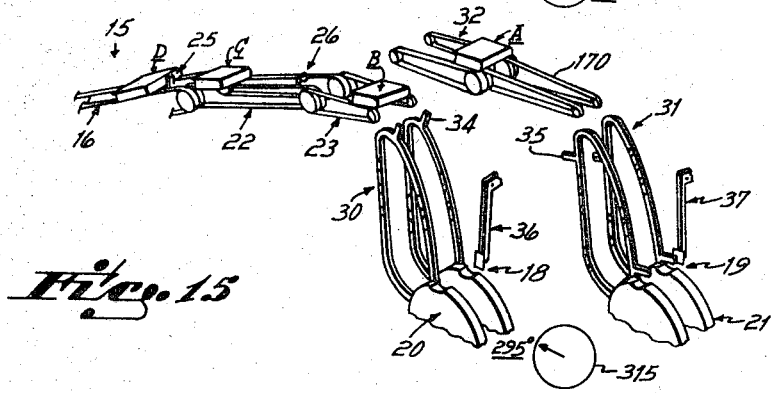

When the main sprocket 315 has rotated to 295° point, the cams 109 and 123 interact with their respective followers 108 and 121 to move the movable conveyors 23 and 32 to their lower and upper positions, respectively, depicted in FIG. 15. At this stage of the cycle book B has advanced to a point where its leading edge is at the free end of movable conveyor 23. Book A has advanced to a point where it is partially off movable conveyor 32. Book C, which had been momentarily arrested by gate 25, is now located on the intermediate conveyor 22, but has not yet reached the book gate 26. Book D, which has not yet reached the book gate 25, is now stopped at this point by that gate.

Figure 16:
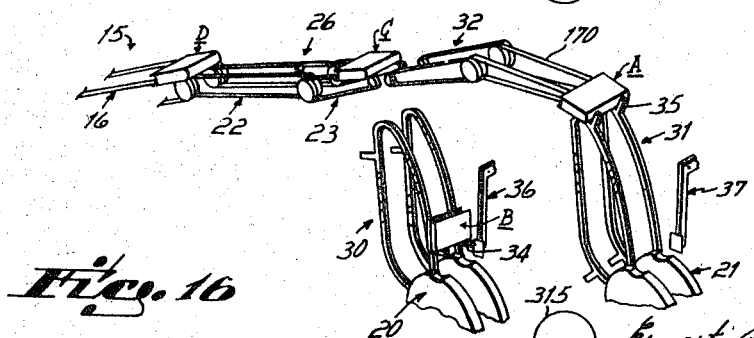
Figure 21:
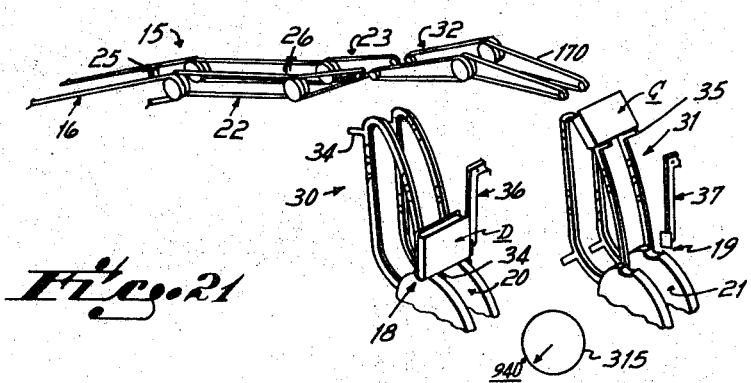
Figure 22:
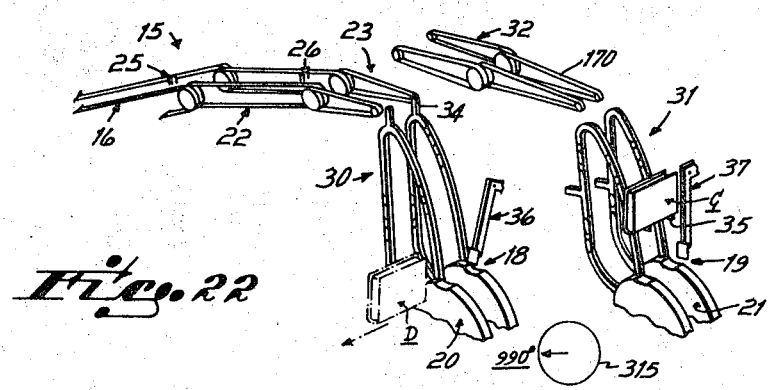
Figure 23:
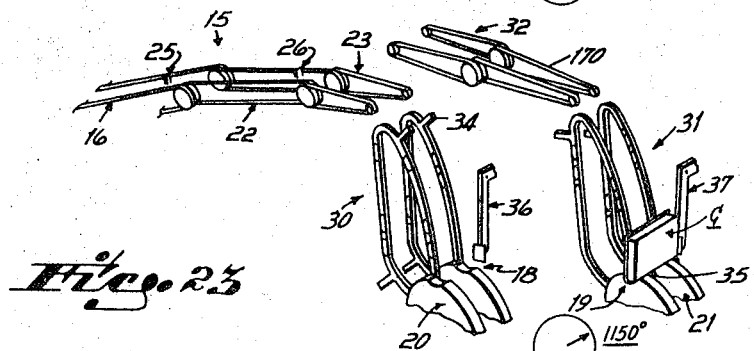
Figure 24:
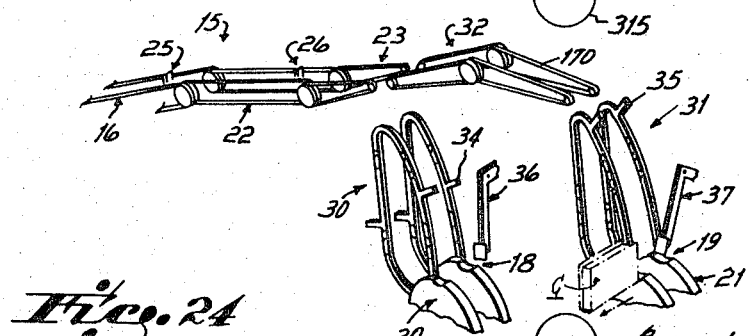

The main sprocket 315 continues to rotate, eventually reaching the 475° point depicted in FIG. 16. At this point in the operational cycle, the cams 109 and 123 interact with their respective cam follower wheels 108 and 121 to move the movable conveyors 23 and 32 to their upper and lower positions, respectively. Book A is advanced to a point where its leading backbone edge is just engaging the finger 35 of the second branch conveyor 31. Book B is transferred from the movable conveyor 23 to the branch conveyor 30 where it is supported with its backbone edge in contact with finger 34. Book C is advanced from a position on the intermediate conveyor 22 to the movable conveyor 23, being stopped momentarily therebetween by the book gate 26 which assures proper timed release of the books. Book D which had been held by the gate 25 is now released and is partially on the intermediate conveyor 22.

The main sprocket 315 continues rotating, and at the 580° point (FIG. 17) book B is deposited by the finger 34 at a fixed position on the book support 20 of station 18 with its backbone edge lowermost, the finger 34 traveling in the space between the discs comprising the support 20. Book A is transferred to the second branch conveyor 31 where it is supported with its backbone lowermost by finger 35. Book C is transferred from the movable conveyor 23 to movable conveyor 32. Book D is moved to a position on conveyor 23, being momentarily stopped by the gate 26 to assure proper timing.

Also at this point in the cycle book B which has just been deposited on the book support 20, begins to be transferred by pusher assembly 36 from the fixed position where it has been deposited by the finger 34, to a selectively variable delivery position. Thus, at this point the cam lobe 247B of the cam 245B begins engaging the cam follower 243B pivoting the lever 240B, lowering the pusher rod 250B and pivoting the bellcrank 263B, in turn advancing the pusher plate 268B mounted on the bellcrank arm 267B toward the delivery position. Continued rotation of the main sprocket 315 further drives the cam 245B further pivoting the lever 240B and in turn further advancing pusher plate 268B. When the main sprocket 315 rotates to an angular position of 630° (FIG. 18) the pusher plate 268B is advanced to the delivery position, thereby advancing book B to the delivery position. The exact extent of travel of the pusher plate 268B during the interval 580°—° depends upon the relative location of the pivot 270B in the slots 271B and 272B in a manner described previously. At the delivery position book B is removed by suitable means (not shown) for further transfer to the next processing station in the book-binding process.

When the main sprocket 315 arrives at an angular position of 630° a corresponding to the termination of the book advancing operation of pusher assembly 36, and to the advance of a book deposited on the support 20 at a fixed position to a selectively variable delivery position, the book A has advanced by transfer station 31 to a point near the book support 21. Book C has also advanced closer to the book support 21 having been moved by the movable conveyor 32. Book D is now completely supported by the movable conveyor 23.

Continued rotation of the main sprocket 315 continues to advance the books A, C, and D. at the 790° point of the cycle 9 (FIG. 19) book A is delivered to the support 21 with its backbone lowermost, the supporting finger 35 passing downwardly between the discs comprising the support 21. Book C advances further toward branch conveyor 31. Book D is transferred from the movable conveyor 23 to the branch conveyor 30 where it is supported by the finger 34. The movable conveyors 23 and 32 are in the process of being returned to their upper and lower positions, respectively.

Concurrently with the deposit of book A on the support 21, the pusher assembly 37 initiates advancement of the book from the fixed position to the selectively variable delivery position. Specifically, the cam lobe 247A engages the cam follower 243A, lowering the rod 250A, pivoting the bellcrank 263A which in turn moves the pusher plate 268A secured to the bellcrank arm 267A, and hence book A, toward the selectively variable delivery position. Book A continues to be advanced from the fixed position on the support 21 where it was deposited by finger 35 to the selectively variable delivery position until the 840° point in the cycle (FIG. 20) of the main sprocket 315 is reached. At this point in the operational cycle, book A is advanced to the delivery position. Book C is advanced on the movable conveyor 32 to a point where it is ready to be transferred to the finger 35. Book D is advanced to a position nearer book support 20. The movable conveyors 23 and 32 are positioned in their upper and lower positions, respectively.

Continued rotation of the main sprocket 315 to the 940° point of the operational cycle (FIG. 21) cause the book D to be delivered to the fixed position on support 20 at station 18 by finger 34 which then passes between the discs comprising the support. Concurrently with the arrival of book D at the fixed position on the book support 20, the push assembly 36 initiates advancement of book D to the selectively variable delivery position horizontally displaced therefrom in a manner similar to that described in connection with book B.

At this point in the cycle, book C which previously has been on the conveyor belt 170 is being conveyed by the second branch conveyor 31 and supported by finger 35.

Further rotation of main sprocket 315 causes the pusher assembly 36 to deliver book D to the selectively variable delivery position. Specifically, when the main sprocket 315 has rotated to the 990° point in the cycle (FIG. 22) the book D is advanced to the selectively variable position. Additionally, book C is advanced further on the second branch conveyor 31 to a position nearer the fixed position on support 21 at the lower station 19.

When the main sprocket 315 has rotated through an angle of 1,150° (FIG. 23) finger 35 deposits book C at the fixed position on the support 21 with its backbone lowermost. Simultaneously with deposit of book C on the support 21 at station 19, the pusher assembly 37 initiates advancement of book C from the fixed position to the selectively variable delivery position. Book C continues to be advanced by the pusher assembly 37 until the 1,200° point of the operational cycle (FIG. 24) is reached whereupon the plate 268A reaches its outer limit of travel. Further rotation of the main sprocket 315 returns the pusher assembly 37 to its retracted position depicted in FIG. 12.

The foregoing description of an operational cycle indicates the manner in which four books A—D are gated from the approach conveyor 16, alternatively conveyed to the branch conveyors 30 and 31, deposited at fixed positions on supports 20 and 21 at stations 18 and 19, and advanced to selectively variable delivery positions by the pusher assemblies 36 and 37. From the foregoing description those skilled in the art will appreciate that continued rotation of the main shaft 315 produces a repetition of the various steps of the operational cycle, resulting in the transporting of additional books from upper station 15 to delivery positions at second and third lower stations 18 and 19.

An important feature of the pusher assemblies 36 and 37 of this invention is that the delivery position, to which books are advanced subsequent to their deposit by fingers 34 and 35 on supports 20 and 21, may be adjusted during the operational cycle. This is accomplished by merely moving the pivots 270A and 270B, for example, by rotating the crank 301. Thus, the delivery position controlled by the limit of travel of the pusher plates 268A and 268B can be altered without interrupting the operation of the book-transferring apparatus.

Another important advantage of this invention is that books moving on a conveyor with their pages horizontal and their backbones leading may be transferred to a lower position where the pages are vertical and the backbone lowermost without destroying the round or otherwise damaging the book. The coaction of the downwardly moving fingers 34 and 35, which support the back of the book, and the book supports 20 and 21, particularly, the ability of the fingers to pass downwardly through the book supports via the spaces between the discs which comprise the book supports, enables books to be gently transferred through a substantial vertical distance without undue impact, thereby preserving the round or not otherwise harming the book.

I claim:

1. Apparatus for transferring a book between one station, whereat said book is vertically disposed with its back lowermost, and another station located above said one station, said apparatus comprising:
   a book support located at said one station including at least two spaced coaxial discs rotatably mounted about a horizontal axis and having formed in their respective peripheries a plurality of aligned circumferentially spaced, differently concavely configured book-back-engaging surfaces, said surfaces being adapted to intimately contact different thickness book backs, and thereby support different thickness books without destroying the round therein when said discs are rotated to different angular positions; and a generally vertically disposed endless conveyor having an outwardly projecting finger adapted to pass between said discs for delivering and removing books from said support as said finger moves toward and away from said disc periphery, respectively. ntin the cycle (FIG. 20) of the main sprocket 315 is reached. At this point in the operational cycle, book A is advanced to the delivery position. Book C is advanced on the movable conveyor 32 to a point where it is ready to be transferred to the finger 35. Book D is advanced to a position nearer book support 20. The movable conveyors 23 and 32 are positioned in their upper and lower positions, respectively.

Continued rotation of the main sprocket 315 to the 940° point of the operational cycle (FIG. 21) cause the book D to be delivered to the fixed position on support 20 at station 18 by finger 34 which then passes between the discs comprising the support. Concurrently with the arrival of book D at the fixed position on the book support 20, the push assembly 36 initiates advancement of book D to the selectively variable delivery position horizontally displaced therefrom in a manner similar to that described in connection with book B.

At this point in the cycle, book C which previously had been on the conveyor belt 170 is being conveyed by the second branch conveyor 31 and supported by finger 35.

Further rotation of main sprocket 315 causes the pusher assembly 36 to deliver book D to the selectively variable delivery position. Specifically, when the main sprocket 315 has rotated to the 990° point in the cycle (FIG. 22) the book D is advanced to the selectively variable position. Additionally, book C is advanced further on the second branch conveyor 31 to a position nearer the fixed position on support 21 at the lower station 19.

When the main sprocket 315 has rotated through an angle of 1,150° (FIG. 23) finger 35 deposits book C at the fixed position on the support 21 with its backbone lowermost. Simultaneously with deposit of book C on the support 21 at station 19, the pusher assembly 37 initiates advancement of book C from the fixed position to the selectively variable delivery position. Book C continues to be advanced by the pusher assembly 37 until the 1,200° point of the operational cycle (FIG. 24) is reached whereupon the plate 268A reaches its outer limit of travel. Further rotation of the main sprocket 315 returns the pusher assembly 37 to its retracted position depicted in FIG. 12.

The foregoing description of an operational cycle indicates the manner in which four books A—D are gated from the approach conveyor 16, alternatively conveyed to the branch conveyors 30 and 31, deposited at fixed positions on supports 20 and 21 at stations 18 and 19, and advanced to selectively variable delivery positions by the pusher assemblies 36 and 37. From the foregoing description those skilled in the art will appreciate that continued rotation of the main shaft 315 produces a repetition of the various steps of the operational cycle, resulting in the transporting of additional books from upper station 15 to delivery positions at second and third lower stations 18 and 19.

An important feature of the pusher assemblies 36 and 37 of this invention is that the delivery position, to which books are advanced subsequent to their deposit by fingers 34 and 35 on supports 20 and 21, may be adjusted during the operational cycle. This is accomplished by merely moving the pivots 270A and 270B, for example, by rotating the crank 301. Thus, the delivery position controlled by the limit of travel of the pusher plates 268A and 268B can be altered without interrupting the operation of the book-transferring apparatus.

Another important advantage of this invention is that books moving on a conveyor with their pages horizontal and their backbones leading may be transferred to a lower position where the pages are vertical and the backbone lowermost without destroying the round or otherwise damaging the book. The coaction of the downwardly moving fingers 34 and 35, which support the back of the book, and the book supports 20 and 21, particularly, the ability of the fingers to pass downwardly through the book supports via the spaces between the discs which comprise the book supports, enables books to be gently transferred through a substantial vertical distance without undue impact, thereby preserving the round or not otherwise harming the book.

I claim:

1. Apparatus for transferring a book between one station, whereat said book is vertically disposed with its back lowermost, and another station located above said one station, said apparatus comprising:

a book support located at said one station including at least two spaced coaxial discs rotatably mounted about a horizontal axis and having formed in their respective peripheries a plurality of aligned circumferentially spaced, differently concavely configured book-back-engaging surfaces, said surfaces being adapted to intimately contact different thickness book backs, and thereby support different thickness books without destroying the round therein when said discs are rotated to different angular positions; and a generally vertically disposed conveyor having an outwardly projecting finger adapted to pass between said discs for delivering and removing books from said support as said finger moves toward and away from said disc periphery, respectively.

UNITED STATES PATENT OFFICE
CERTIFICATE OF CORRECTION

Patent No. 3,554,359   Dated January 12, 1971

Inventor(s) Ernest J. Sarring

It is certified that error appears in the above-identified patent and that said Letters Patent are hereby corrected as shown below:

Column 17, line 10 through Column 18, line 51, delete "ntin the cycle (FIG. 20) of the . . . periphery, respectively."

Signed and sealed this 30th day of March 1971.

(SEAL)
Attest:

EDWARD M.FLETCHER, JR.
Attesting Officer

WILLIAM E. SCHUYLER, JR
Commissioner of Patents